US007873905B2

(12) United States Patent
Taguchi et al.

(10) Patent No.: US 7,873,905 B2
(45) Date of Patent: Jan. 18, 2011

(54) IMAGE PROCESSING SYSTEM (75) Inventors: Shinya Taguchi, Tokyo (JP); Shunsuke Nagatani, Tokyo (JP); Masakazu Ogawa, Tokyo (JP); Eisuke Kanno, Tokyo (JP); Michitoshi Suzuki, Tokyo (JP); Yutaka Egawa, Tokyo (JP); Nobuyuki Yamazoe, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 896 days.

(21) Appl. No.: 10/625,700

(22) Filed: Jul. 24, 2003

(65) Prior Publication Data
US 2004/0155898 A1 Aug. 12, 2004

(30) Foreign Application Priority Data
Sep. 19, 2002 (JP) .............................. 2002-272523

(51) Int. Cl.
*G06F 3/00* (2006.01)
*G06F 3/01* (2006.01)
(52) U.S. Cl. ...................... 715/723; 715/716; 715/719; 715/720; 715/721; 715/730
(58) Field of Classification Search ................. 715/723, 715/720, 716, 719, 730, 721
See application file for complete search history.

(56) References Cited
U.S. PATENT DOCUMENTS

| 5,521,841 | A | * | 5/1996 | Arman et al. ................ 715/723 |
| 5,760,767 | A | * | 6/1998 | Shore et al. ................. 715/723 |
| 5,852,435 | A | * | 12/1998 | Vigneaux et al. ............ 345/428 |
| 6,249,281 | B1 | * | 6/2001 | Chen et al. ................... 715/753 |
| 6,332,147 | B1 | * | 12/2001 | Moran et al. ............. 715/500.1 |
| 6,463,444 | B1 | * | 10/2002 | Jain et al. ................. 707/104.1 |
| RE38,401 | E | * | 1/2004 | Goldberg et al. ............ 715/720 |
| 6,751,776 | B1 | | 6/2004 | Gong |
| 6,789,228 | B1 | | 9/2004 | Merril et al. |
| RE38,609 | E | * | 10/2004 | Chen et al. ................... 715/730 |
| 6,804,684 | B2 | | 10/2004 | Stubler et al. |
| 6,807,361 | B1 | * | 10/2004 | Girgensohn et al. ........... 386/52 |
| 6,834,371 | B1 | | 12/2004 | Jensen et al. |
| 6,988,244 | B1 | | 1/2006 | Honda et al. |

(Continued)

FOREIGN PATENT DOCUMENTS
JP    A 5-282379    10/1993

(Continued)

OTHER PUBLICATIONS
Office Action issued in U.S. Appl. No. 10/661,590; Feb. 20, 2007.

(Continued)

*Primary Examiner*—Weilun Lo
*Assistant Examiner*—Nicholas Augustine
(74) *Attorney, Agent, or Firm*—Oliff & Berridge, PLC (57) ABSTRACT An interface screen used for the correlation between video data and reference picture data includes: a screen 70 for displaying the video data reproduced by a video player; and a screen 73 for displaying a reference picture to be correlated with. When an operator enters an instruction to the operation portion 74 while reproduction video, the data for a reference picture displayed on the screen is correlated with a corresponding reproduction time position of the video data.

6 Claims, 8 Drawing Sheets

U.S. PATENT DOCUMENTS

| | | | |
|---|---|---|---|
| 7,068,309 B2 | 6/2006 | Toyama et al. | |
| 7,143,362 B2 * | 11/2006 | Dieberger et al. | 715/764 |
| 7,149,974 B2 * | 12/2006 | Girgensohn et al. | 715/723 |
| 7,167,191 B2 | 1/2007 | Hull et al. | |
| 7,174,055 B2 | 2/2007 | Hori et al. | |
| 7,203,380 B2 * | 4/2007 | Chiu et al. | 382/284 |
| 7,209,942 B1 | 4/2007 | Hori et al. | |
| 2003/0177115 A1 | 9/2003 | Stern et al. | |
| 2003/0184598 A1 * | 10/2003 | Graham | 345/838 |
| 2003/0189588 A1 * | 10/2003 | Girgensohn et al. | 345/723 |
| 2004/0155898 A1 | 8/2004 | Taguchi et al. | |

FOREIGN PATENT DOCUMENTS

| | | |
|---|---|---|
| JP | A-09-069165 | 3/1997 |
| JP | A-09-116740 | 5/1997 |
| JP | A 11-039343 | 2/1999 |
| JP | A-11-144067 | 5/1999 |
| JP | A 11-184867 | 7/1999 |
| JP | A 11-308567 | 11/1999 |
| JP | A-2000-115736 | 4/2000 |
| JP | A-2000-278635 | 10/2000 |
| JP | A-2001-209361 | 8/2001 |
| JP | A-2002-229438 | 8/2002 |
| JP | A 2002-272567 | 9/2002 |

OTHER PUBLICATIONS

S. Uchihashi et al., "Video Manga: Generating Semantically Meaningful Video Summaries," Proceedings of the ACM Multimedia, pp. 383-392, 1999.
Office Action issued in U.S. Appl. No. 10/661,590; Jun. 28, 2007.
Office Action issued in U.S. Appl. No. 10/661,590; Oct. 25, 2007.
Office Action issued in U.S. Appl. No. 10/661,590; May 9, 2008.
Office Action issued in U.S. Appl. No. 10/661,590; Jan. 21, 2009.
Office Action issued in U.S. Appl. No. 10/661,590; Aug. 28, 2009.
U.S. Appl. No. 10/661,590, filed Sep. 15, 2003 to Shunsuke Nagatani et al.
Office Action issued in U.S. Appl. No. 10/661,590 on Mar. 19, 2010.
Clements, Cardillo and Miller, "Phonetic Searching of Digital Audio." pp. 1-10.
Office Action issued in U.S. Appl. No. 10/661,590 on Sep. 21, 2010.

* cited by examiner

IMAGE PROCESSING SYSTEM

CROSS REFERENCE OF RELATED APPLICATION

This application is based on and claims priority under 35 U.S.C. §119 with respect to Japanese Patent Application No. 2002-272523 filed on Sep. 19, 2002, the entire content of which is incorporated herein by reference.

BACKGROUND OF THE INVENTION

1. Field of the Invention

The present invention relates to a system for performing correlation process in order to synchronously reproduce video data (moving picture data) and still picture data.

2. Description of the Related Art

Services for distributing various types of contents to browsing clients, such as personal computers and mobile terminals, have been widely provided as specific area or wide area services.

There are various forms for the content distribution systems, and as the network communication technique has been developed, content data including video data are also distributed.

As the overview of the content distribution system, various content data are registered to a distribution server, and when a browsing client accesses the distribution server and selects and requests a desired content, the distribution server provides the requested content data for the browsing client.

In this process, in order to easily select the content, the video data distribution system correlates, with the video data, a content record (meta-data) that includes the title of the content, a keyword and category information to select the content and information for a content creator, so that the convenience for a user who employs the browsing client to watch the content is increased.

The types of video data to be distributed have been expanded to include a variety of materials, ranging from entertainments such as movies to educational references, lectures and visual presentations. Especially for lectures and visual presentations given with supporting reference materials, not only video pictures but also still pictures are provided for a browsing client, and the synchronous reproduction of these pictures is demanded, so that the information they provide can be fully employed to promote a better understanding of the content.

Further, for the video data for lectures that include many scenes, it is also requested that a specific scene in the video data where a reference is employed be searched for and reproduced. When such a search function can be performed by referring to the still picture for a representative scene in the video data, it is convenient because a desired scene can be easily and quickly found.

SUMMARY OF THE INVENTION

The present invention has been made to solve the above-explained technical problems, and therefore, it is one object of the present invention to correlate video data with corresponding still picture data to enable synchronous reproduction of these data.

The present invention can be provided by various forms, such as an image processing system, an image processing method and a program that permits a computer to serve as the image processing apparatus or to perform the image processing method. In any form, the correlation between video data and still picture data is performed to enable synchronous reproduction of these data.

According to an image processing system for this invention, a video display unit reproduces and displays video data on a screen, and an image display unit reproduces and displays still picture data on the screen. When, during the reproduction of the video data, a designation unit accepts an instruction from a user to designate a still picture displayed on the screen, a correlation unit correlates the designated still picture data with the reproduction time position in the video data.

Therefore, the still picture data, such as reference picture data, can be correlated at a reproduction time position of the video data in accordance with the user's desire. It is preferable that the video picture and the still picture be displayed on the same screen, so that the user can enter a designation instruction at an accurate time.

The image processing system of the invention can register, to a distribution server that provides video data and still picture data in accordance with a request fromabrowsing client, the video data and the still picture data that are correlated by the registered client. In this case, the corresponding function is provided for the registered client.

The correlation function may be written as a program. Further, in accordance with the request from the browsing client, the distribution server may provide the video data and the program for the browsing client, and the browsing client executes the program as the video data are reproduced, and may request the distribution server the still picture data that are correlated at the reproduction time position.

The individual functions of the system may be provided as special devices, however, these functions can be implemented when a computer executes the program of the invention.

The image processing method of the invention can be implemented by using the image processing system of the invention.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The preferred embodiment of the present invention will be specifically explained.

Figure 1:
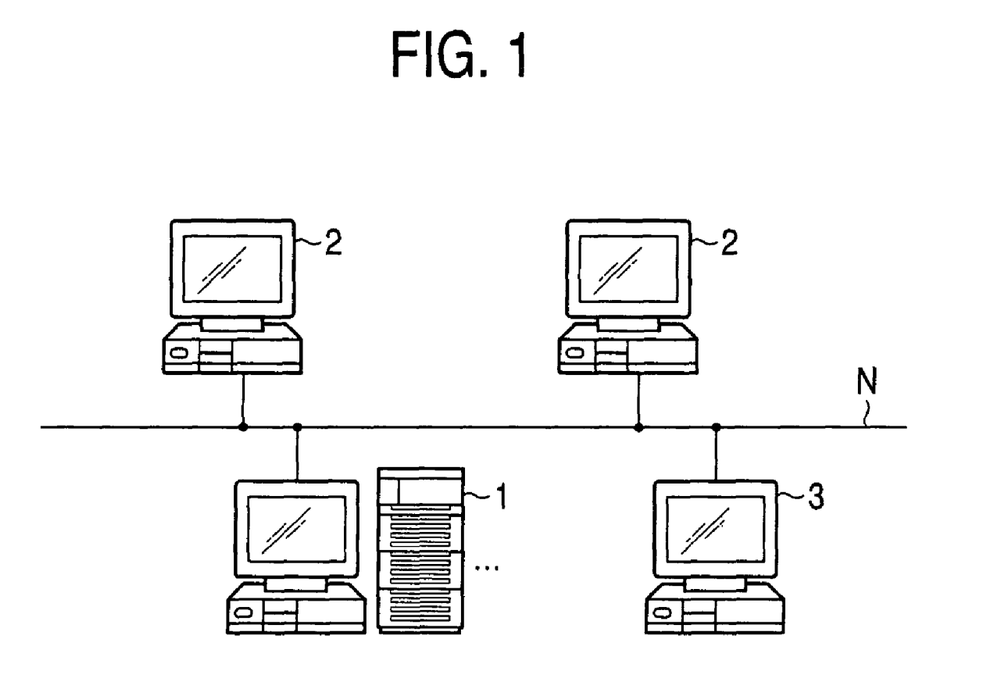
FIG. 1 is a diagram showing a system configuration according to one embodiment of the present invention.

FIG. 1 is a diagram showing a content distribution system according to the present invention. The content distribution system includes a distribution server 1, browsing clients 2 and a registered client 3, all of which are connected via the Internet N. Among these components, the present invention is mainly applied for the registered client 3.

The distribution server 1, the browsing clients 2 and the registered client 3 execute a program stored on a computer-readable recording medium according to the invention by using computer hardware so as to perform predetermined processes, and the browsing clients 2 are constituted by personal computers especially having a browsing function for browsing contents.

The distribution server 1 stores, as each data content, video data and a content record (meta-data) including still picture data such as slide picture data or reference picture data correlated with the video data, voice index data for a search and a content title. When a request is received from the browsing client 2, the distribution server 1 distributes corresponding content data.

Figure 2A:
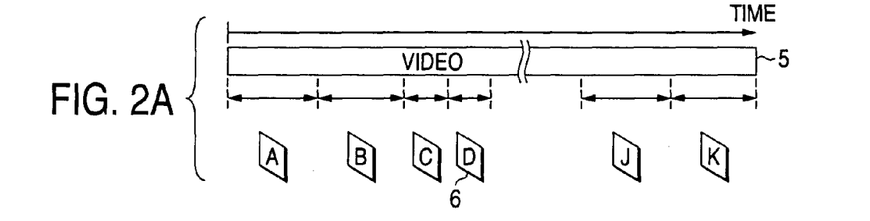
FIGS. 2A and 2B are diagrams for explaining the relationship between video data and picture data according to the embodiment of the invention.
Figure 2B:
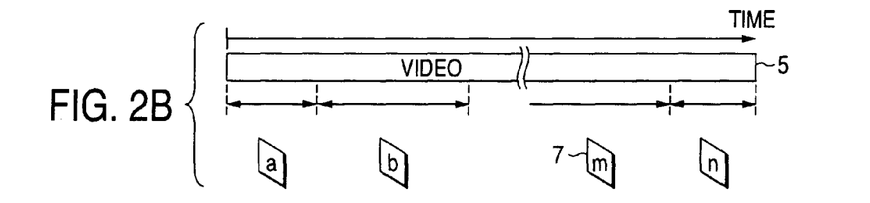

FIG. 2A is a diagram showing the correlation between video data 5 and slide picture data 6, and FIG. 2B is a diagram showing the correlation between video data 6 and reference picture data 7.

Either the slide picture data 6 or the reference picture data 7 maybe attached to the video data 5, and in the explanation for this specification, both of or one of the slide picture data 6 and the reference picture data 7 may be written as picture data, except when either data is specifically designated.

In this embodiment, the reference picture data 7 is defined as still picture data that an operator correlates with an arbitrary time position in video data, while reproducing the video data. The same definition may be applied for the slide picture data 6.

The video data 5 to be registered are moving picture data obtained by converting MPEG data into data stream for distribution, while the slide picture data 6 (A to K) are still picture data that are extracted automatically or by an operator from the video data 5 through the pre-process for the arrangement registration. The slide picture data 6 indicate representative pictures for a scene having a specific time width in the video, and are correlated with the corresponding scenes in the video data.

The slide picture data 6 are employed mainly for a search process wherein the user searches for a desired content, or for a desired scene in the content video.

The reference picture data (a to n) are still picture data that the operator correlates with arbitrary reproduction time positions of the video data 5, while reproducing the video data 5 and watching the obtained pictures during the pre-process of the arrangement registration using the registered client 3. Example reference picture data are those for reference materials that are employed for a video presentation or a lecture that is presented by the video data 5.

As will be described later, the reference picture data 7 are correlated so as to be maintained on the screen until the time position whereat the next reference data 7 should be displayed is reached. As a result, the reference picture data 7 are correlated with the scene having a specific time width in the video representing the reference, and for the browsing user, the reference picture data can be reproduced and displayed in synchronization with the corresponding video data.

As will be described later, upon the reception of a request from the browsing client 2 that employs a browser, the distribution server 1 distributes the content data, such as the video data 5 and the still picture data 6 and 7, to the browsing client 2, and the data are displayed by the browsing client 2.

Figure 3:
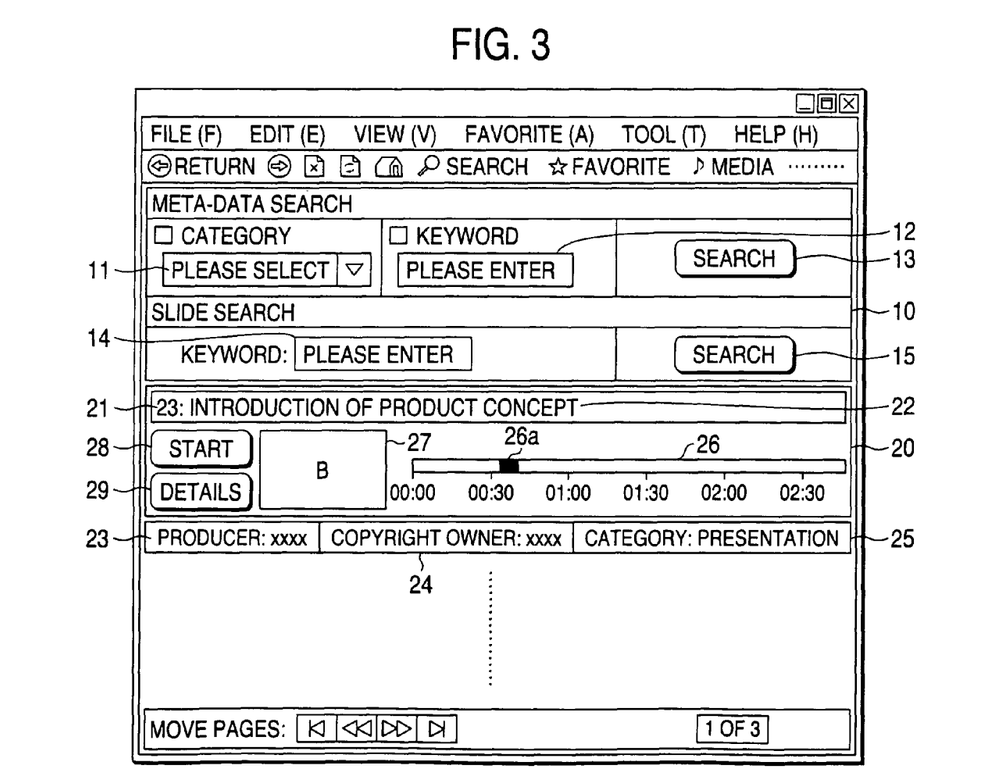
FIG. 3 is a diagram showing a screen provided by a browsing client according to the embodiment of the invention.

FIG. 3 is a diagram showing a default screen for the list of contents that are displayed by the browsing client 2 that has accessed the distribution server 1 at a predetermined URL. The content list screen includes a search interface 10 and content interfaces 20 for individual contents. When a browsing user enters an instruction to the search interface 10 by using keys or by pointing at, a desired content can be found from the registered contents. When the browsing user enters an instruction to the content interfaces 20 by pointing at, the contents of the selected content data can be displayed and browsed.

For the search, the search interface 10 employs the meta-data or the voice index data that are registered in the distribution server 1 in correlation with the individual content data. The search interface 10 includes: a drop-down window 11 to select and enter a category; a keyword input portion 12 to search for desired content data; a search button 13 to enter an instruction to request the distribution server 11 to perform the search process based on the category and the keyword and to transmit the search results; a keyword input unit 14 to search for desired content data using the voice index data; and a search button 15 to enter an instruction to request the distribution server 1 to perform the search process based on the keyword and to transmit the search results.

The voice index data registered in the distribution server 1 in correlation with the content data is voice waveform data included in the content. The distribution server 1 converts the keyword entered at the keyword input portion 14 into voice waveform data, and compares the waveform data to search for content that includes the keyword.

Each of the content interfaces 20 includes a content number 21, a content title 22, a content creator 23, a content copyright owner 24 and a content category 25 based on the meta-data, and also displays a time scale 26 and a slide picture 27 for content video. The function for presenting the time scale 26 interlocks as a plug 26a is moved by a user, and changes the slide picture data 6 (A to K) to be displayed as a slide picture 27. As a result, the slide picture corresponding to the reproduction time position of the video data can be reproduced.

Further, a start button 28 and a detail button 29 are provided for the content interface 20. When the user points at the start button 28, the content video data can be obtained from the distribution server 1, and can be reproduced and displayed on the screen of the browsing client. When the user points at the detail button 29, as will be described later, the slide picture data or reference picture data for the content can be collectively obtained from the distribution server 1, and can be displayed as a list on the screen of the browsing client 2.

To cope with the video data 5 and all the correlated still picture data that are provided for the browsing client 2, the browsing client 2 has also a function that, when the user points at the slide picture 27 or a reference picture 30 on the list, the reproduction of the video data is started for a corresponding scene, i.e., at the corresponding reproduction time position, and the obtained picture is displayed.

Figure 4:
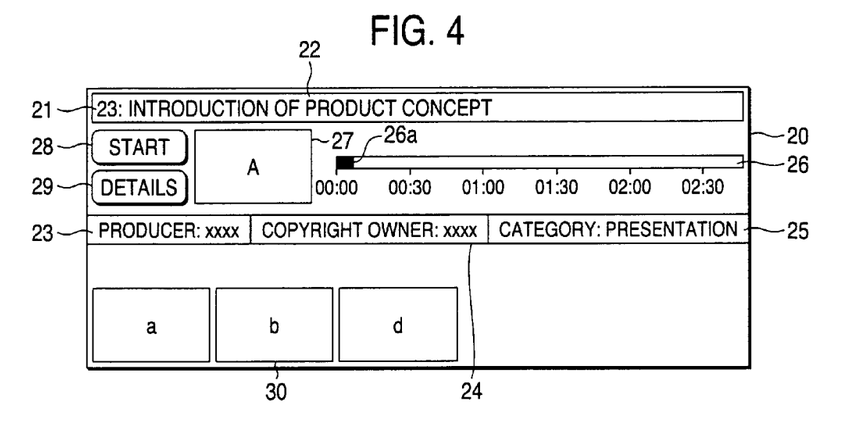
FIG. 4 is a diagram showing a screen provided by the browsing client according to the embodiment of the invention.

For the content for which the correlated reference picture data are stored, the keyword search based on the reference picture data is enabled, and a content interface 20 representing the search results is shown in FIG. 4.

This content interface 20 is substantially the same as that in FIG. 3. In order to present these results, another function is also provided for the browsing client 2, whereby characters included in the reference picture 30 are compared with the input keyword and the list of the pertinent reference pictures 30 is displayed, and whereby, when one of the reference pictures 30 is pointed at by a user, the synchronous reproduction of the content video data is started at the corresponding scene, and the obtained pictures are displayed.

Figure 5:
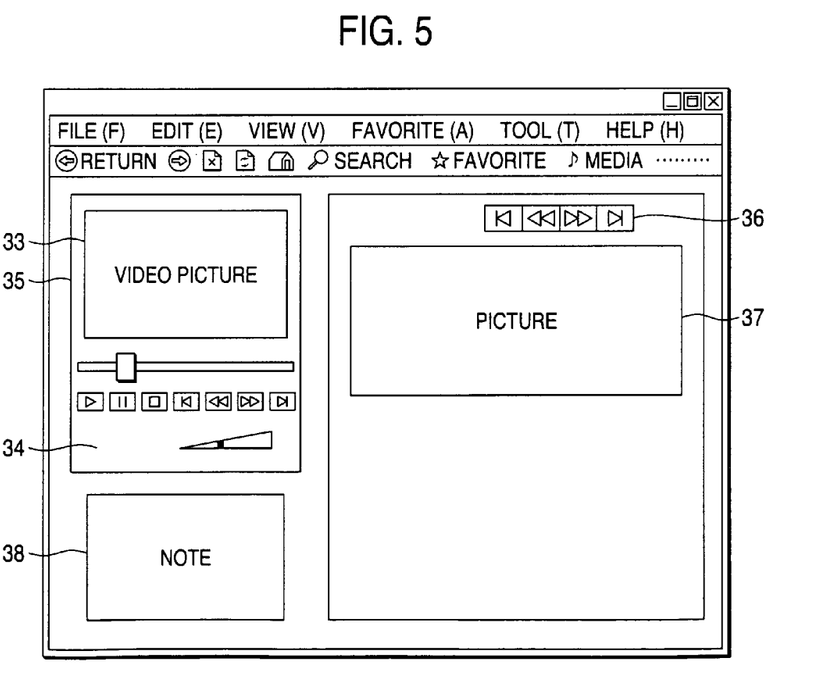
FIG. 5 is a diagram showing a screen provided by the browsing client according to the embodiment of the invention.

In accordance with the user's instruction, the browsing client 2 accesses the distribution server 1, receives desired content data, and displays the content data on a content browsing screen shown in FIG. 5. The content browsing screen has: a video player section 35 that includes a video screen 33, which is used to display a reproduced video image, and a video operation portion 34 where operation buttons, such as reproduction and stop buttons, are arranged; an image display section 37, which has an operation portion 36 where a frame feeding button is arranged and is used to reproduce and display still picture data; and a note display screen section 38, which is used to display a program description concerning the content data.

Therefore, when the browsing user points at desired contents data, the video image can be reproduced and displayed on the video screen 33, and since the correlation process that will be described later has been performed, the reference picture (or the slide picture) corresponding to the reproduction time position of the video data can be synchronously displayed in the image display section 37.

Figure 6:
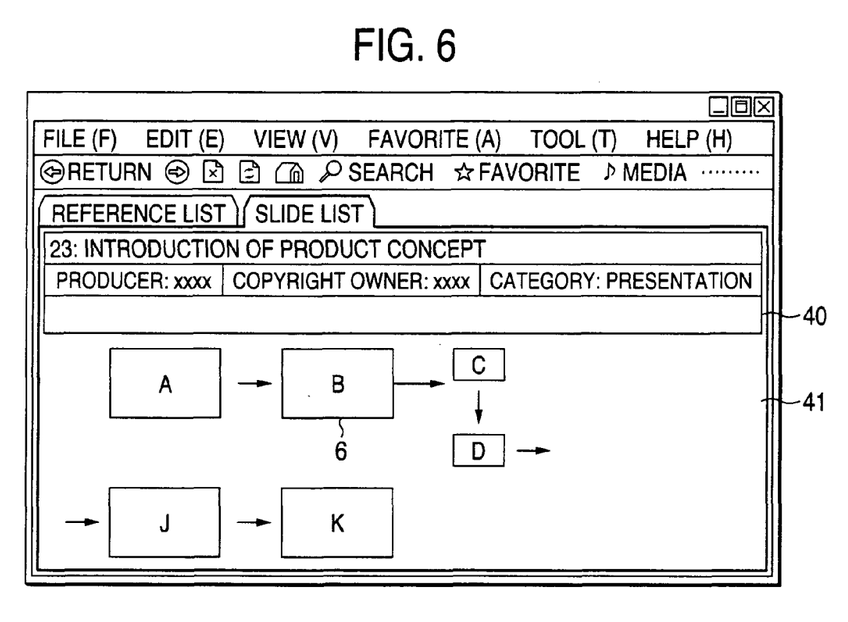
FIG. 6 is a diagram showing a screen provided by the browsing client according to the embodiment of the invention.
Figure 7:
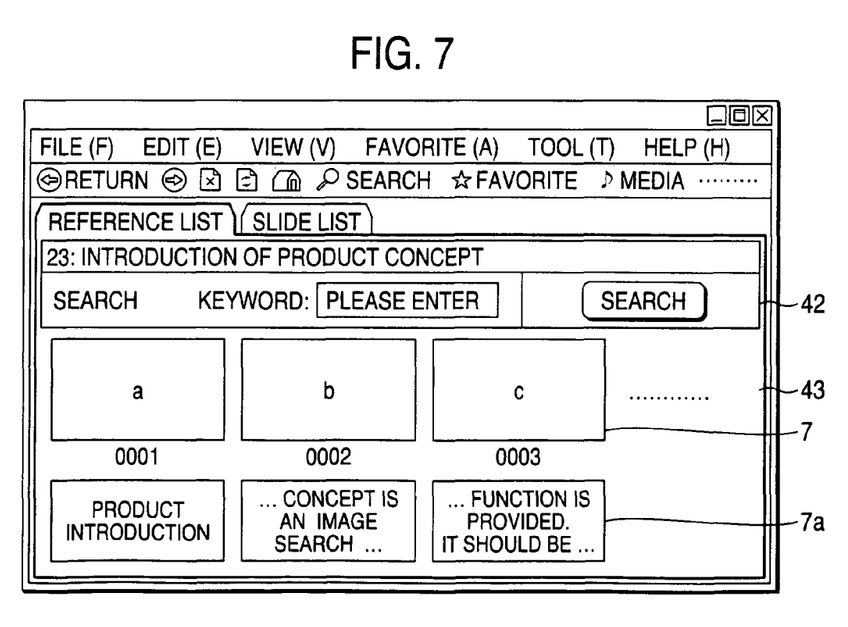
FIG. 7 is a diagram showing a screen provided by the browsing client according to the embodiment of the invention.

Further, when the detail button 29 is depressed, the browsing client 2 accesses the distribution server 1, receives the image data of the desired content collectively, and displays these received image data on a details display screen shown in FIG. 6 or 7.

In FIG. 6, the list of the slide picture data 6 is shown. The items for the meta-data of the content are displayed in a record data display portion 40, and all the slide pictures 6 correlated with the content are displayed in a time series manner in a slide picture display portion 41.

In this case, the sizes of the slide pictures 6 displayed in the slide picture display portion 41 are increased in accordance with the time length of the corresponding scenes. As is shown in FIG. 2A, for example, the slide pictures 6 C and D for which the time lengths of the scenes are shorter than the others are displayed smaller than the other slide pictures in the slide picture display portion 41. For this size conversion, the information about the time length of the scene need only be added to each slide picture, and the distribution server 1 need only change the picture size upon the reception of the details display request.

The image size may be set in accordance with the importance level of the scene, e.g., in accordance with the change of the contents of the scene or with the intent of a creator.

FIG. 7 is a diagram showing a screen for displaying the list of the reference picture data 7. The items of the meta-data of the content are displayed in a record data display portion 42, and in a reference picture display portion 43, all the reference pictures 7 correlated with the content are displayed in a time series manner, and character strings 7a that are segments extracted from the reference pictures 7 are also displayed.

These character strings 7a are extracted as needed by the character recognition process, and are compared with the keyword to search for the reference picture, as is described above.

When a user points at one of still slide or reference pictures on the list shown in FIG. 6 or 7, the video player 35 is displayed on the screen, and the video data can be reproduced beginning at the corresponding time position, and be displayed on the screen.

An explanation will be given for the processing for registering the video data and the correlated image data.

Figure 8:
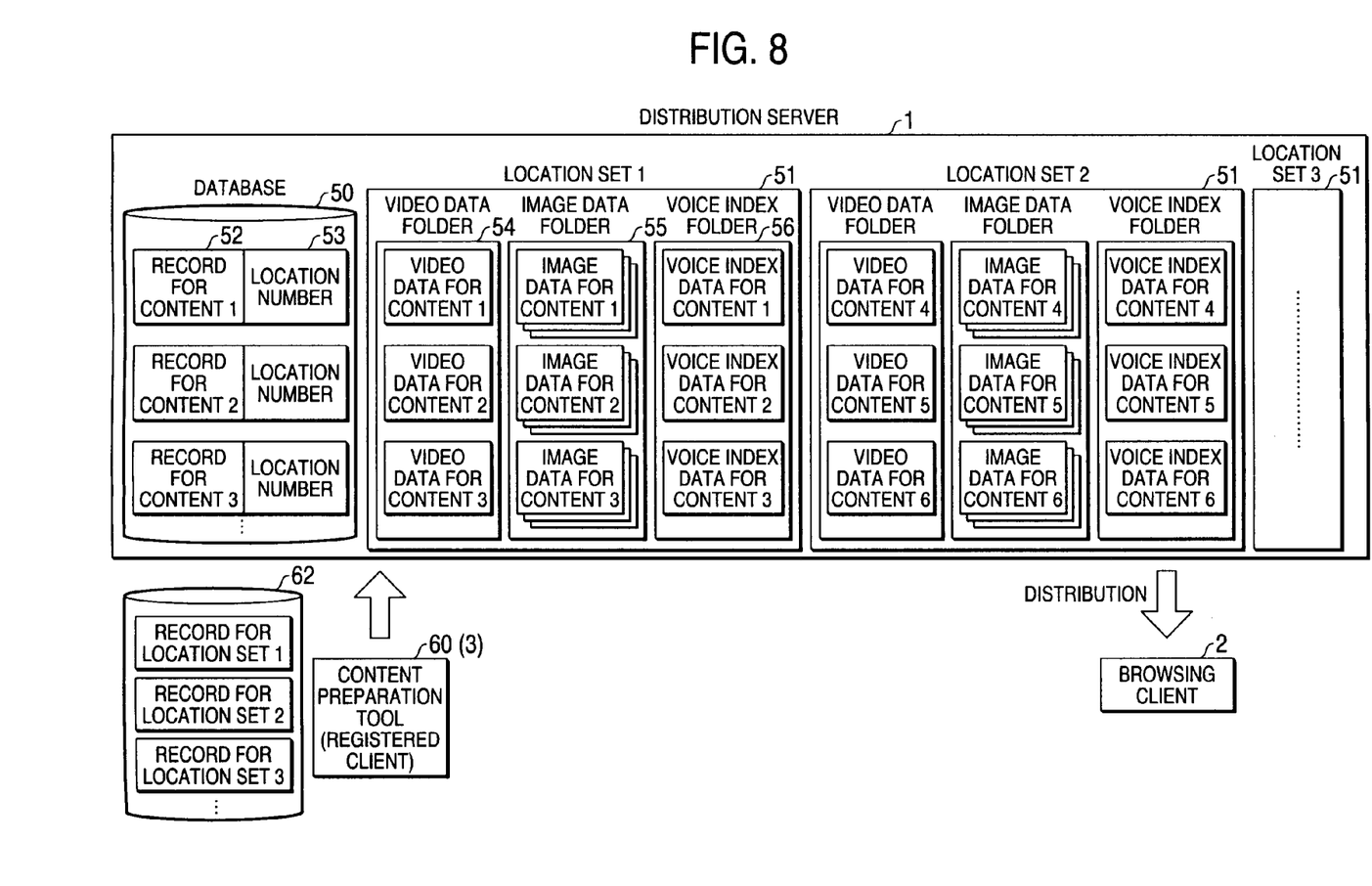
FIG. 8 is a diagram for explaining a distribution server according to the embodiment of the invention.

As is shown in FIG. 8, the distribution server 1 includes a database 50, for storing and managing the records of the individual registered contents; and a multiple location-sets 51, for storing the substances of the content data.

In the database 50, stored are: content records 52, including the meta-data of the content data, the location file path and the location URL; and numbers 53 for specifying location sets where the content data are stored. When the database 50 is examined, the content data can be arranged in the folder of the location set 51, and the content data requested by the browsing client 2 can be distributed.

Each of the location sets 51 is a storage area to store one or multiple sets of content data, and a group of the location sets 51 constitutes a content data storage area for the distribution server 1.

In the example in FIG. 8, for each location set 51 provided are: a video data folder 54, for storing video data; an image data folder 55, for storing still picture data correlated with the reproduction time position of the video data; and a voice index folder 56, for storing voice index data. The data of each content are stored in the corresponding folders 54 to 56, so that the data for the same content are stored in the same location set 51.

The arrangement and registration of the content data to each location set 51 is performed by an operator using a content preparation tool 60 of the registered client 3.

The content preparation tool 60 performs: a process for converting MPEG video data into video data streams for distribution; a process for registering the converted video data; a process for registering the video data 5 in correlation with the slide picture data 6; a process for registering the video data 5 in correlation with the reference picture data 7, which will be described later; and a process for registering the video data 5 in correlation with voice index data.

Figure 9:
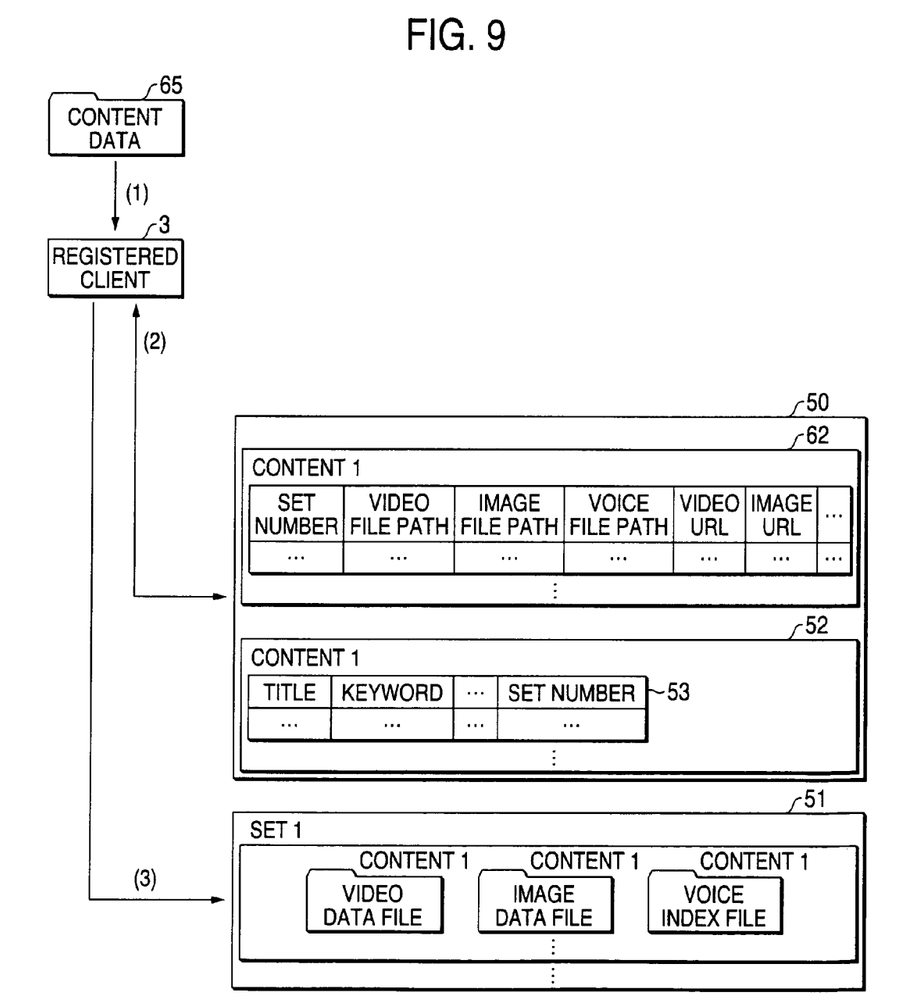
FIG. 9 is a diagram for explaining the content data arrangement/registration processing according to the embodiment of the invention.

As is shown in FIG. 9, the process for arranging and registering the content data (video data, image data and voice index data) is initiated by entering to the registered client 3 content data 65 to be registered (1), and by connecting the registered client 3 to the distribution server 1.

Then, the registered client 3 examines the set record 62 in the database 50, and sets the location set number of the content data of an archive file, the file paths of the media data and the URLs of the media data (2). Next, the registered client 3 transmits the content data to the distribution server 1 for the registration (3).

At this time, the meta-data entered by the operator are also set in the content record 52, and the content record 52 and the set record 62 are correlated with each other based on the location set number.

Further, as will be described later, the correlation data (a program in this embodiment), which the registered client 3 has prepared in the process for correlating the reference picture data and the video data, is also transmitted to and registered by the distribution server 1. The correlation data are distributed together with the video data to the browsing client 2.

The content data that are thus arranged and located are provided by the distribution server 1, while the database 50 is examined in accordance with the request from the browsing client 2.

Specifically, when the browsing client 2 issues to the distribution server 1 a request together with information about the designated contents, the distribution server 1 obtains the location set number of the content data by examining the content record 52, examines the set record 62 based on the location set number to obtain the URLs of the video data and the picture data, and provides the URLs to the browsing client 2. The browsing client 2 accesses content data files based on the URLs provided by the distribution server 1, and obtains and displays the video data and picture data.

An explanation will now be given for the processing performed by the registered client 3 for correlating the video data 5 with the reference picture data 7.

Figure 10:
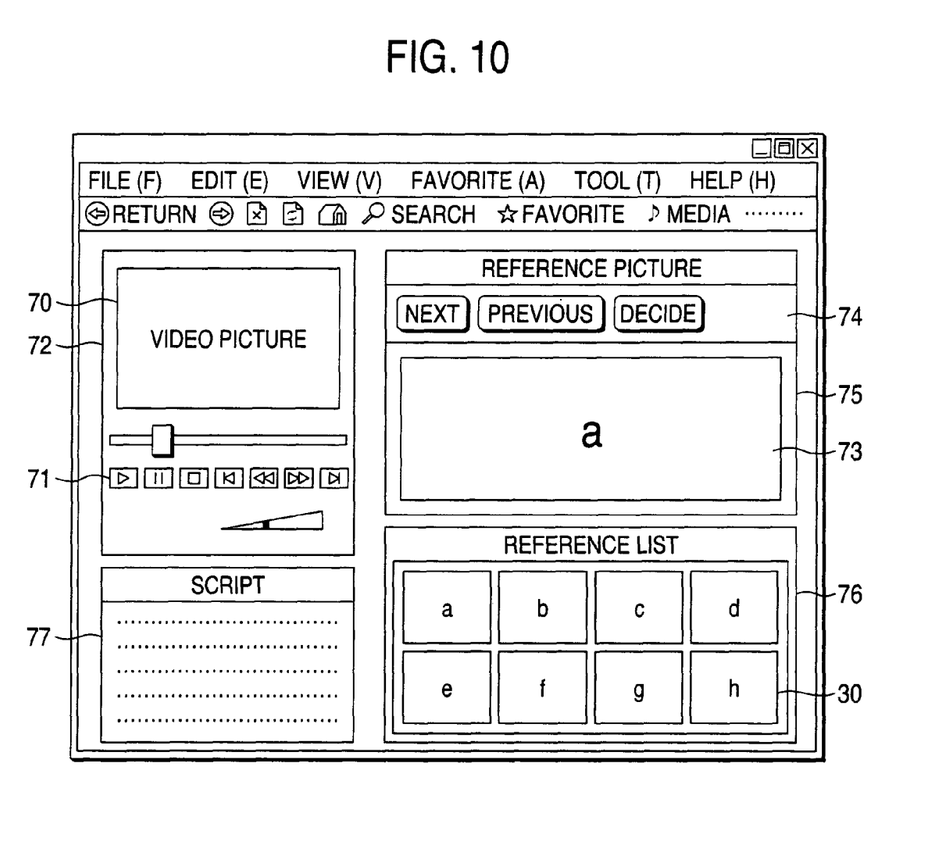
FIG. 10 is a diagram showing a screen provided by a registered client according to the embodiment of the invention.

FIG. 10 is a diagram showing a correlation interface displayed on the screen of the registered client 3. This interface is used when, as a pre-process for registration, the operator correlates the reference picture data with an arbitrary time position of the video data.

Before the correlation process is initiated by the operator, the video data file and the reference picture file are read by the registered client 3, and the correlation interface is displayed.

This interface screen includes: a video player section 72, which has a video screen 70 to display a video image obtained by reproducing the video data 5, and a video operation portion 71 where operation buttons, such as a reproduction button and a stop button, are arranged; an image display section 75, which has a picture screen 73 to display a reference picture obtained by reproducing the reference picture data 7 and an operation portion 74 where a frame feed button and a decision button are arranged; a list display portion 76, to display the thumbnails of the reference pictures 30 included in the reference picture file that is read; and a script display screen 77 to display correlation data (written as a program) obtained through the correlation operation.

When on the interface screen the operator points at the frame feed button of the operation portion 74, an arbitrary picture in the reference pictures 30 in the list display portion 76 can be expanded and displayed on the picture screen 73, so that the operator can confirm the details of the picture. Further, when the operator points at the operation button of the video operation section 71, the video data 5 can be reproduced and the obtained video images can be displayed on the video scene 70. When the operator points at the decision button in the operation portion 74 during the reproduction of the video data 5, the reference picture data displayed on the picture screen 73 can be correlated with the pertinent reproduction time position of the video data 5.

Therefore, the operator can perform the processing while confirming the video picture and the reference picture on the same screen, and can correlate desired reference pictures with desired time positions of the video.

The registered client 3 has a function for, based on the instructions entered by the operator, writing a program that represents the correlation. When the operator manipulate the operation buttons, arbitrary number of reference picture data sets 7 can be correlated with arbitrary reproduction time positions of the video data 5, and these correlation data are written.

Figure 11A:
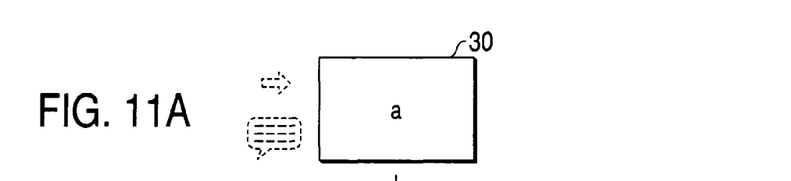
FIGS. 11A to 11C are diagrams for explaining the display style for a reference picture according to the embodiment of the invention.
Figure 11B:
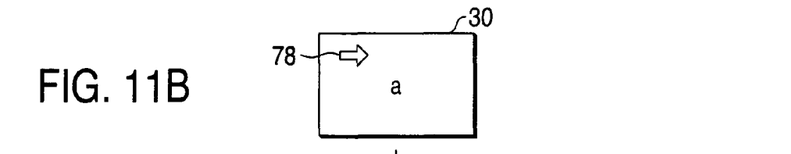
Figure 11C:
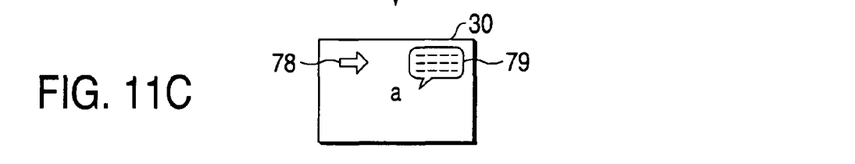

As is shown in FIGS. 11A to 11C, based on the instructions entered by the operator, the registered client 3 can add, to the reference picture 30, an arrow 78 and a note 79 that are separately prepared. The reproduction time positions and the display positions for these added images are also included in the correlation data, and these added picture data are registered together with the reference picture data to the distribution server 11. It should be noted that, in the order from FIGS. 11A to 11C, the image of the arrow 78 and the note 79 are added to the reference picture 30 as the video data 5 are reproduced.

As is described above, the correlation program prepared by the registered client 3 is registered to the distribution server 1, and is provided together with the video data for the browsing client 2. An explanation will be specifically given for the synchronous reproduction process performed by the browsing client 2 for the video data nd the program.

Figure 12:
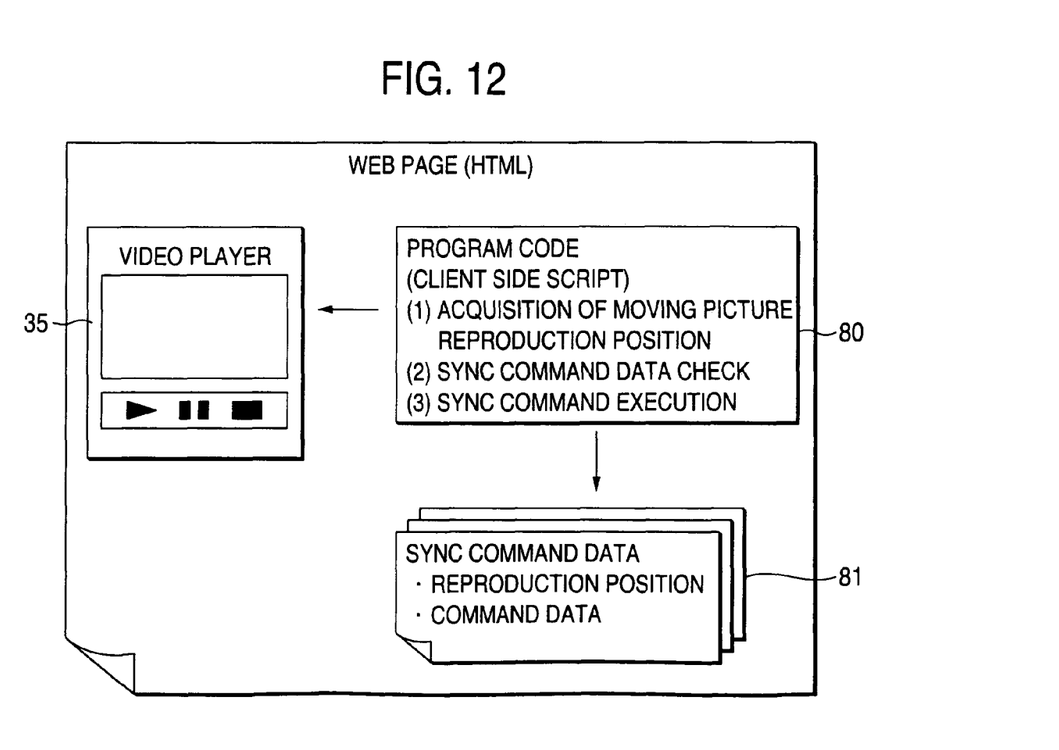
FIG. 12 is a diagram for explaining the Web function of the browsing client according to the embodiment of the invention.

FIG. 12 is a diagram showing a Web page displayed by the Web browser of the browsing client 2. In the Web page, not only the video player 35 shown in FIG. 5 but also the correlation program that provided by the distribution server 1 are included. This program includes a program code 80 and multiple sync command data sets 81.

The program code 80 includes: a moving picture reproduction position acquisition program, for obtaining reproduction time position data for the video data; a sync command data check program, for examining the sync command data 81; and a sync command execution program, for executing a command corresponding to the sync command data 81.

The sync command data 81 includes video data reproduction time data indicating a command execution time, and command data to be executed. That is, each sync command data set 81 is present for the respective reference picture data correlated with the video data, and includes: the reproduction time position data indicating the position of the reference picture data correlated with the video data; and a command for requesting the distribution server 1 predetermined reference picture data when the reproduction time position is reached.

Therefore, the program code 80 is executed synchronously with the reproduction of the video data by the video player 35, and the moving picture reproduction acquisition program obtains the reproduction time position of the video data. Then, the sync command data check program determines whether there is the sync command data 81 that corresponds to the obtained reproduction time position. When such sync command data 81 is present, the command execution program executes the command in the sync command data, and requests the distribution server 1 for the corresponding reference picture data. This processing is repeated during the reproduction of the video data. The reference picture data that is provided is immediately reproduced by the browsing client 2, and is displayed on the image display section 37, and as is shown in FIG. 5, the video data and the reference picture data are reproduced and displayed synchronously based on the correlation data.

In this embodiment, the reference picture is so set to be displayed on the image display section 37 until the display time position for the next reference picture is reached. Therefore, in the correlation process, the operator need only designate, for the video data, the start time position where at the reference picture data is displayed. However, the start and end times for displaying the reference picture data may be entered, and at the designated time interval, the reference pictures may be displayed.

Further, in this embodiment, a program form to be executed by the browsing client 2 is employed for the correlation data. However, the correlation data may be provided as a correlation table, and the browsing client may store all the necessary reference picture data, and when a reproduction time position is reached, may reproduce and display the corresponding reference picture data.

As is described above, according to the invention, since the correlation process for the video data and the still picture data is performed by a user while the video data and the still picture data are reproduced and displayed. Therefore, through the easy and precise manipulation of a user, the still picture data can be correlated with an arbitrary reproduction time position of the video data, and the video picture and the still picture can be synchronously displayed at a time desired by the user.

What is claimed is:

1. An image processing system, comprising:
a display screen for displaying a single interface including:
a video display section for reproducing and displaying video data on a screen;
a sync command data check program;
a picture display section for reproducing and displaying when initiated by the sync command data check program at least one of (i) still picture data extracted from the video data and (ii) data of a presentation document on the screen;
a designation section for accepting an instruction from a user to designate at least one item that is displayed by the picture display section, on the screen; and
a correlation section for, upon the instruction entered by the user during the reproduction of the video data creating sync command that correlates the at least one designated item with a reproduction time position in the video data, wherein the at least one designated item correlated with the video are stored with keyword searchable data of at least one of (iii) text data of the presentation document and (iv) voice index data of the video data for each still picture,
the sync command data check program checks for sync command data during reproduction and display of video data on the screen;
wherein the at least one designated item is displayed in different sizes, and the different sizes are based on the time length and importance level of a corresponding section of the video data.

2. An image processing system, comprising:
a registered client including
a display screen for displaying a single interface including:
a video display section for reproducing and displaying video data on a screen,
a sync command data check program,
a picture display section for reproducing and displaying when initiated by the sync command data check program at least one of (i) still picture data extracted from the video data and (ii) data of a presentation document on the screen,
a designation section for accepting an instruction from a user to designate at least one item that is displayed by the picture display section on the screen, and
a correlation section for, upon the instruction entered by the user during the reproduction of the video data creating sync command that correlates the at least one designated item with a reproduction time position in the video data; and
a distribution server for holding the video data and the at least one designated item that are correlated with each other, and in accordance with a request from a browsing client, providing the video data and the at least one designated item, wherein
the at least one designated item correlated with the video data are stored with keyword searchable data of at least one of (iii) text data of the presentation document and (iv) voice index data of the video data for each still picture,
the sync command data check program checks for sync command data during reproduction and display of video data on the screen;
wherein the at least one designated item is displayed in different sizes, and the different sizes are based on the time length and importance level of a corresponding section of the video data.

3. An image processing system according to claim 2, wherein the distribution server distributes, to the browsing client, correlation data for the video data and the at least one designated item, and provides the at least one designated item requested by the browsing client.

4. An image processing method, comprising:
reproducing and displaying video data on a screen;
providing a single interface screen for:
reproducing and displaying when initiated by a sync command data check program at least one of (i) still picture data extracted from the video data and (ii) data of a presentation document on the screen; and
in accordance with an instruction entered by a user during the reproduction of the video data to designate at least one item that is reproduced and creating sync command data that correlates the at least one designated item with a reproduction time position in the video data, wherein
the at least one designated item correlated with the video data are stored with keyword searchable data of at least one of (iii) text data of the presentation document and (iv) voice index data of the video data for each still picture; and
checking for sync command data during reproduction and display of video data on the screen;
wherein the at least one designated item is displayed in different sizes, and the different sizes are based on the time length and importance level of a corresponding section of the video data.

5. An image processing method, comprising:
reproducing and displaying video data on a screen;
providing a single interface screen for:
reproducing and displaying when initiated by a sync command data check program at least one of (i) still picture data extracted from the video data and (ii) data of a presentation document on the screen; and
in accordance with an instruction entered by a user during the reproduction of the video data to designate at least one item that is reproduced and displayed, creating sync command data that correlates the at least one designated item with a reproduction time position in the video data; and
registering the video data and the at least one designated item together with correlation data to a distribution server, wherein
the at least one designated item correlated with the video data are stored with keyword searchable data of at least one of (iii) text data of the presentation document and (iv) voice index data of the video data for each still picture; and
checking for sync command data during reproduction and display of video data on the screen;
wherein the at least one designated item is displayed in different sizes, and the different sizes are based on the time length and importance level of a corresponding section of the video data.

6. The image processing method according to claim 5, wherein
the correlation data is a program for requesting from the distribution server the at least one designated item in accordance with the reproduction time position in video data, in accordance with a request from a browsing client, the distribution server provides video data and the program for the browsing client, and the browsing client executes the program as the video data are reproduced, and requests from the distribution server the at least one designated item that are correlated with the reproduction time position.

* * * * *